US009759283B2

(12) United States Patent
Talavasek

(10) Patent No.: US 9,759,283 B2
(45) Date of Patent: Sep. 12, 2017

(54) BICYCLE WITH SUSPENSION

(71) Applicant: SPECIALIZED BICYCLE COMPONENTS, INC., Morgan Hill, CA (US)

(72) Inventor: Jan Talavasek, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/143,209

(22) Filed: Apr. 29, 2016

(65) Prior Publication Data

US 2016/0238101 A1 Aug. 18, 2016

Related U.S. Application Data

(62) Division of application No. 13/607,470, filed on Sep. 7, 2012, now Pat. No. 9,328,793, which is a division of application No. 12/833,745, filed on Jul. 9, 2010, now Pat. No. 8,480,064.

(51) Int. Cl.
*F16F 9/06* (2006.01)
*F16F 9/32* (2006.01)
*B62K 25/20* (2006.01)
*F16F 9/56* (2006.01)
*B62K 25/04* (2006.01)
*B62K 25/28* (2006.01)

(52) U.S. Cl.
CPC ............ *F16F 9/3271* (2013.01); *B62K 25/04* (2013.01); *B62K 25/20* (2013.01); *F16F 9/06* (2013.01); *F16F 9/56* (2013.01); *B62K 25/286* (2013.01); *F16F 9/062* (2013.01)

(58) Field of Classification Search
CPC ................ B62K 25/20; F16F 9/06; F16F 9/56
See application file for complete search history.

(56) References Cited

U.S. PATENT DOCUMENTS

| 3,837,355 | A | 9/1974 | Wirges |
| 5,511,811 | A | 4/1996 | Pileggi |
| 5,860,665 | A | 1/1999 | Giles |
| 5,887,857 | A | 3/1999 | Perrin |
| 5,961,102 | A | 10/1999 | Oyaizu |

(Continued)

FOREIGN PATENT DOCUMENTS

| DE | 102007056313 | 5/2009 |
| EP | 0898092 | 2/1999 |

(Continued)

OTHER PUBLICATIONS

Fox Racing Shox, 2005 Rear Shock Owner's Manual.

(Continued)

*Primary Examiner* — Bradley King
(74) *Attorney, Agent, or Firm* — Knobbe Martens Olson & Bear LLP

(57) ABSTRACT

A bicycle can include a suspension system with a shock absorber. The shock absorber can have a sag position which can be adjustable. Sag refers to the amount of movement experienced by the suspension under a static load, such as that of the weight of a rider. Methods and systems to set sag can include at least one valve in fluid communication with a gas chamber of the shock absorber. In some embodiments, the at least one valve can be used to automatically set the sag position based on an individual's weight and riding position.

10 Claims, 11 Drawing Sheets

(56) References Cited

U.S. PATENT DOCUMENTS

| | | |
|---|---|---|
| 5,971,117 A | 10/1999 | Grundei et al. |
| 6,105,988 A | 8/2000 | Turner et al. |
| 6,135,434 A | 10/2000 | Marking |
| 6,213,261 B1 | 4/2001 | Kunkel |
| 6,328,292 B1 | 12/2001 | Jarstad |
| 6,520,524 B1 | 2/2003 | Costa |
| 6,612,410 B1 | 9/2003 | Antonovsky |
| 7,284,766 B2 | 10/2007 | Temmerman et al. |
| 7,309,063 B2 | 12/2007 | Södahl |
| 7,374,028 B2 | 5/2008 | Fox |
| 7,690,666 B2 | 4/2010 | McAndrews |
| 7,703,585 B2 | 4/2010 | Fox |
| 8,403,115 B2 | 3/2013 | Gartner et al. |
| 9,057,416 B2 | 6/2015 | Talavasek |
| 2002/0175035 A1 | 11/2002 | Achenbach |
| 2003/0019701 A1 | 1/2003 | Hodgson |
| 2005/0035505 A1 | 2/2005 | Soderdahl |
| 2006/0181053 A1 | 8/2006 | Huang et al. |
| 2009/0267316 A1 | 10/2009 | Gonzalez et al. |
| 2010/0044975 A1 | 2/2010 | Yablon et al. |
| 2010/0109277 A1 | 5/2010 | Furrer |
| 2010/0252972 A1 | 10/2010 | Cox et al. |
| 2010/0276906 A1 | 11/2010 | Galasso et al. |
| 2010/0314209 A1 | 12/2010 | Gonzalez et al. |
| 2011/0202236 A1 | 8/2011 | Galasso et al. |
| 2012/0007327 A1 | 1/2012 | Talavasek |
| 2012/0080279 A1 | 4/2012 | Galasso et al. |
| 2012/0136537 A1 | 5/2012 | Galasso et al. |

FOREIGN PATENT DOCUMENTS

| | | |
|---|---|---|
| GB | 1093327 | 11/1967 |
| GB | 1238508 | 7/1971 |
| JP | 2000-266099 | 9/2000 |
| JP | 2006-97880 | 4/2006 |
| TW | 201287 | 3/1993 |
| TW | 485936 | 5/2002 |
| TW | 512801 | 12/2002 |
| TW | 200635825 | 10/2006 |

OTHER PUBLICATIONS

Extended European Search Report for European Application No. 11172073.6 dated Oct. 12, 2011.

Extended European Search Report for European Application No. 12183732.2 dated Apr. 4, 2013.

Taiwanese Search Report for Taiwanese Application No. 100124336 dated May 27, 2013.

BICYCLE WITH SUSPENSION

CROSS-REFERENCE TO RELATED APPLICATIONS

This application is a divisional of U.S. application Ser. No. 13/607,470, filed Sep. 7, 2012, which is a divisional of U.S. application Ser. No. 12/833,745, filed Jul. 9, 2010. Each of the foregoing applications is hereby incorporated by reference herein in its entirety and is to be considered a part of this specification.

BACKGROUND OF THE INVENTION

Field of the Invention

The present invention relates generally to bicycle suspension systems. In particular, the present invention relates to shock absorbers and suspension assemblies suitable for use in connection with off-road bicycles.

Description of the Related Art

Off-road bicycles, or mountain bikes, may be equipped with front and rear suspension assemblies operably positioned between the frame of the bicycle and the front and rear wheels, respectively. Providing front and rear suspension on a mountain bike potentially improves handling and performance by absorbing bumps, and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

Accordingly, rear suspension systems commonly incorporated on engine-driven vehicles, such as motorcycles, have proven undesirable for use with pedal-driven vehicles, such as mountain bikes. In addition, because a mountain bike is propelled solely by power output from the rider, it is desirable that the rear suspension assembly be lightweight. Rear suspension systems of engine-driven vehicles commonly emphasize strength over weight and, therefore, have not been widely incorporated on mountain bikes.

Bicycle shock absorbers having rider-adjustable compression and rebound damping characteristics have been used to match a desired level of pedaling efficiency and ride comfort with a type of terrain encountered. A rider may adjust the compression damping setting of a shock absorber to trade improved pedaling efficiency for improved bump absorption. For example, an adjustable shock absorber may desirably be set to a firm setting while a rider is on a steep hill climb to increase the amount of pedaling energy reaching the driven wheel and reduce the amount of pedaling energy dissipated by the suspension. Conversely, an adjustable shock absorber may desirably be set to a relatively soft compression damping setting where a rider is traveling fast downhill.

In addition, many bicycle shock absorbers have other rider-adjustable settings. For example, some bicycle shock absorbers allow the user to set the sag. Sag refers to the amount of movement experienced by the suspension under just the static load, or body weight, of the rider.

All of these different adjustments can be overwhelming to a user, especially a less experienced rider. Not only do some shock absorbers have multiple adjustments but some adjustments require a specific procedure that can be time consuming and difficult to perform.

For example, to set the sag on currently available air shock absorbers, a specific setup procedure, which can include multiple steps and adjustments, is required to ensure maximum performance. Generally, the rider has to adjust the air pressure and the sag position multiple times to achieve the desired sag when sitting on the bike. This includes measuring the shock absorber, filling the shock with air, sitting on the bike, measuring the sag, letting air out of the shock or adding more air, getting back on the bike, and measuring the sag again. These steps are repeated until the sag is set to the desired position.

The desired sag position may be given in a chart in a user manual and indicated as a length or a sag percentage based on the particular shock and the rider's weight among other factors. This can further complicate the procedure.

Because of the perceived difficultly of certain, if not all of the adjustments, some riders may have the shock absorber adjusted or set-up when it is originally purchased and then make no further adjustments. In addition, certain bike shops or consumers may not make all of the right adjustments. This may be in order to save time or just because of lack of understanding of the correct procedure and settings.

Accordingly, a need exists for a shock absorber that simplifies at least some of the adjustment procedures.

SUMMARY OF THE INVENTION

A method of adjusting a bicycle suspension sag position can include multiple steps. One step can be inflating a gas chamber of a bicycle shock absorber through a valve to a pressure value well exceeding that required for a typical rider. Another step can be compressing the shock absorber by a person is sitting on the bicycle in a riding position. A further step can be deflating the gas chamber through the valve while the person is sitting on the bicycle in the riding position until the deflation automatically stops. In some embodiments, another step can include closing the valve.

Some methods can further include one or more of the steps, the person getting off the bike and moving the valve to close a valve port communicating with the gas chamber.

A bicycle assembly according to certain embodiments can comprise a shock absorber. The shock absorber can include a gas chamber, a movable piston within the gas chamber, and at least one valve in communication with the gas chamber. In some embodiments, the gas chamber can be divided by the piston into a first chamber and a second chamber, the first and second chambers configured to be determined at least in part by the position of the piston within the gas chamber, and the at least one valve being positioned to communicate with the first chamber when in an uncompressed position and communicate with the second chamber and not the first chamber when in a compressed position.

In some embodiments, a shock absorber can comprise a gas chamber having an interior surface, a movable piston forming a seal with the interior surface and configured to move along the interior surface, at least one valve for inflating and deflating the gas chamber with fluid and at least one valve port configured to establish fluid communication between the gas chamber and the at least one valve.

In some embodiments, the gas chamber can be divided by the piston into a first chamber and a second chamber, the first and second chambers configured to be determined at least in part by the position of the piston within the gas chamber, and the at least one valve port being positioned to communicate with the first chamber when in an uncompressed position and communicate with the second chamber and not the first chamber when in a compressed position.

Some embodiments of shock absorber can include a bypass channel. The bypass channel can be a groove along an interior surface of the gas chamber or another shape or feature.

In some embodiments of shock absorber the at least one valve port can be in communication with both the first and the second chambers. In some embodiments of shock absorber the at least one valve port can be along the interior surface of the gas chamber.

According to certain embodiments, a method of adjusting a bicycle suspension sag position can comprise providing a bicycle having a shock absorber, inflating a gas chamber of the shock absorber through a valve to a pressure of at least 250 psi; compressing the shock absorber by a person sitting on the bicycle in a riding position; deflating the gas chamber through the valve while the person is sitting on the bicycle in the riding position until the piston passes a valve port; and closing the connection between the valve and a first changeable volume.

In some methods of adjusting a sag position, a shock absorber can include a gas chamber having an interior surface; a movable piston forming a seal with the interior surface and configured to move along the interior surface; at least one valve for inflating and deflating the gas chamber with fluid; and at least one valve port configured to establish fluid communication between the gas chamber and the valve along the interior surface. The gas chamber can be divided by the piston into a first changeable volume and a second changeable volume, the volumes configured to be determined at least in part by the position of the piston within the gas chamber, and the valve port can be along the interior surface such that in a first position the valve is configured to be in fluid communication with the first changeable volume and in a second position the valve is configured to be in fluid communication with the second changeable volume. The method can include inflating the gas chamber of the bicycle shock absorber through the valve to a pressure of at least 250 psi; compressing the shock absorber by a person sitting on the bicycle in a riding position; deflating the gas chamber through the valve while the person is sitting on the bicycle in the riding position until the piston passes the valve port; and closing the connection between the valve and the first changeable volume.

In some embodiments a shock absorber can comprise a spring assembly. The spring assembly can include a gas cylinder having an inner surface, a piston that engages the inner surface, a port and a bypass channel. The gas cylinder and piston can define a gas chamber and a negative gas chamber, wherein the gas chamber is separated from the negative gas chamber by the piston. The port can provide access into the gas cylinder to adjust the pressure within the gas cylinder. The bypass channel can be located at the port to permit fluid to bypass the piston to equalize the pressure in the gas cylinder between the gas chamber and the negative gas chamber.

In certain embodiments of the shock absorber, the port can be positioned along the inner surface of the gas cylinder. The port may provide access to the gas chamber in a first position of the shock absorber and provides access to the negative gas chamber in a second position of the shock absorber A shock absorber according to some embodiments can comprise a housing, a plunger, a port and a channel. The housing can have an internal wall defining an internal chamber, the internal chamber configured to receive air and to act as an air spring. The plunger can be positioned within the internal chamber and sealingly engaging the internal wall, the plunger dividing the internal chamber between a first side and a second side, each of the first and second sides defining an adjustable volume based on the position of the plunger within the internal chamber. The port can be in fluid communication with the internal chamber and configured to open and close to release air from the internal chamber. The channel can be in the internal wall, the channel shaped such that when the plunger is positioned at the channel, air can communicate between the first side and the second side. The channel can be positioned within the internal chamber at the same longitudinal position as the port.

Certain embodiments of a method of setting sag on a bicycle can comprise one or more of the following steps. Over inflating a gas chamber of a shock absorber on a bicycle to an over inflated pressure exceeding a final pressure for a typical rider, the shock absorber comprising a gas cylinder divided between the gas chamber and a negative gas chamber by a piston. Deflating the shock absorber through a port in the shock absorber until the deflation stops, while a user assumes a riding position on the bicycle. Closing the port. Passing the piston over the port after the user has dismounted the bicycle. Equalizing the pressure in the gas cylinder by permitting fluid to go around the piston in the gas cylinder at the port and flow between the gas chamber and the negative gas chamber.

A method may further comprise one or more of the following additional steps. Equalizing a pressure within the negative gas chamber with atmospheric pressure before closing the port. Sealing the gas chamber from the negative gas chamber after equalizing the pressure. Attaching an air pump to a valve in fluid communication with the port. The air pump may be used to both inflate and deflate the pressure of the gas chamber.

In some methods deflating the shock absorber through the port in the shock absorber until the deflation stops can comprise passing the piston by the port. Equalizing the pressure in the gas cylinder can comprise permitting fluid to go around the piston in the gas cylinder at a bypass and flow between the gas chamber and the negative gas chamber. Equalizing the pressure in the gas cylinder can comprise passing the piston over a groove in the gas cylinder. Over inflating the gas chamber can comprise inflating the gas chamber to a pressure of at least, 200, 250, 300, or 350 psi; or to a pressure at least 20%, 30% or 40% over the approximate typical final pressure.

BRIEF DESCRIPTION OF THE DRAWINGS

These and other features, aspects and advantages are described below with reference to drawings of preferred embodiments, which are intended for illustration purposes only.

DETAILED DESCRIPTION OF THE PREFERRED EMBODIMENT

Figure 1:
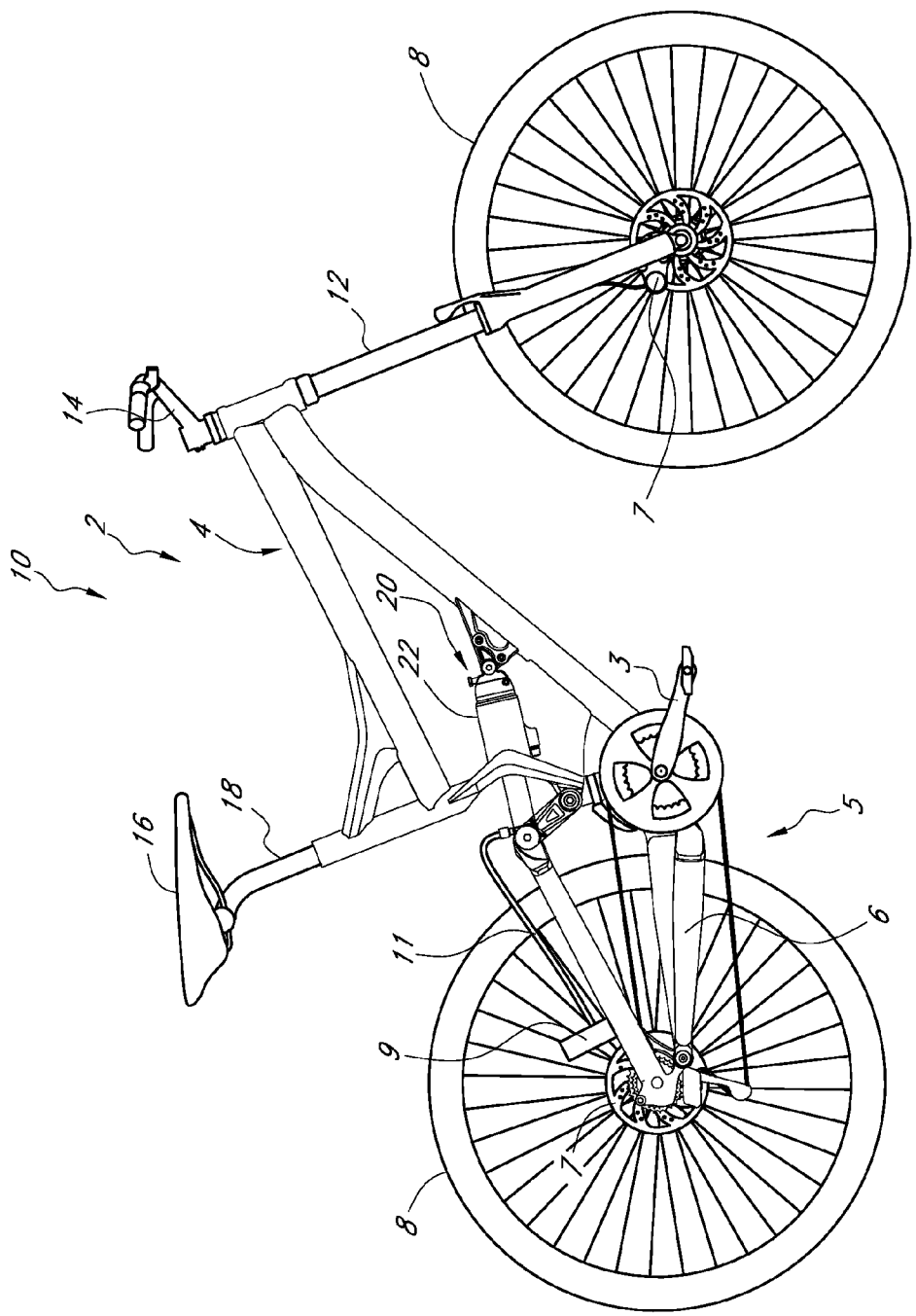
FIG. 1 illustrates a side view of an embodiment of a bicycle.

FIG. 1 illustrates an off-road bicycle, or mountain bike 10, including a preferred embodiment of a rear suspension assembly, or shock absorber. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations relative to a horizontal surface on which the bicycle 10 is supported in an upright position. The above-described coordinate system is provided for the convenience of describing the bicycle illustrated in FIG. 1, and is non-limiting. In addition, certain features and components of the bicycle may be described in terms of relative positions or directions within the particular positions and orientations reflected in the drawings, which is merely for convenience.

The bicycle 10 includes a frame 2, preferably comprised of a generally triangular main frame portion 4 and an articulating frame portion, or subframe 6. The subframe 6 is pivotally connected to the main frame 4. The bicycle 10 also includes a front wheel 8 carried by a front suspension assembly, or front fork 12. A steerer tube (not shown) is journaled for limited rotation about a steering axis defined by the main frame 4. The fork 12 is secured to the main frame 4 by a handlebar assembly 14, as is well known in the art. A rear wheel 8 of the bicycle 10 is carried by the subframe 6. A shock absorber 20 is pivotally connected to both the main frame 4 and the subframe 6 to provide resistance to the pivoting motion of the subframe 6 and, thus, provide resistance to the suspension travel of the rear wheel 8.

In addition, a seat 16 is connected to the frame 2 by a seat post 18, which is received within the seat tube of the main frame 4. The seat 16 provides support for a rider of the bicycle 10. A pedal crank assembly 3 is rotatably supported by the main frame 14 and drives a multi-speed chain drive arrangement 5, as is well known in the art. The bicycle 10 also includes front and rear brake systems 7 for slowing and stopping the bicycle 10. Although the front and rear brakes 7 are illustrated as disc type brakes, alternatively, rim type brakes may be provided, as will be appreciated by one of skill in the art. Rider controls (not shown) are commonly provided on the handlebar assembly 14 and are operable to control shifting of the multi-speed chain drive arrangement 5 and front and rear brake systems 7.

The shock absorber 20 is shown hydraulically connected to a fluid reservoir 9 with a connecting hose 11, though other configurations are also possible including the absence of a fluid reservoir. The fluid reservoir can be similar to those shown in U.S. Pat. Nos. 6,267,400 and 7,552,935, hereby incorporated herein by reference and made a part of this specification.

Shock Absorber

Figure 2:
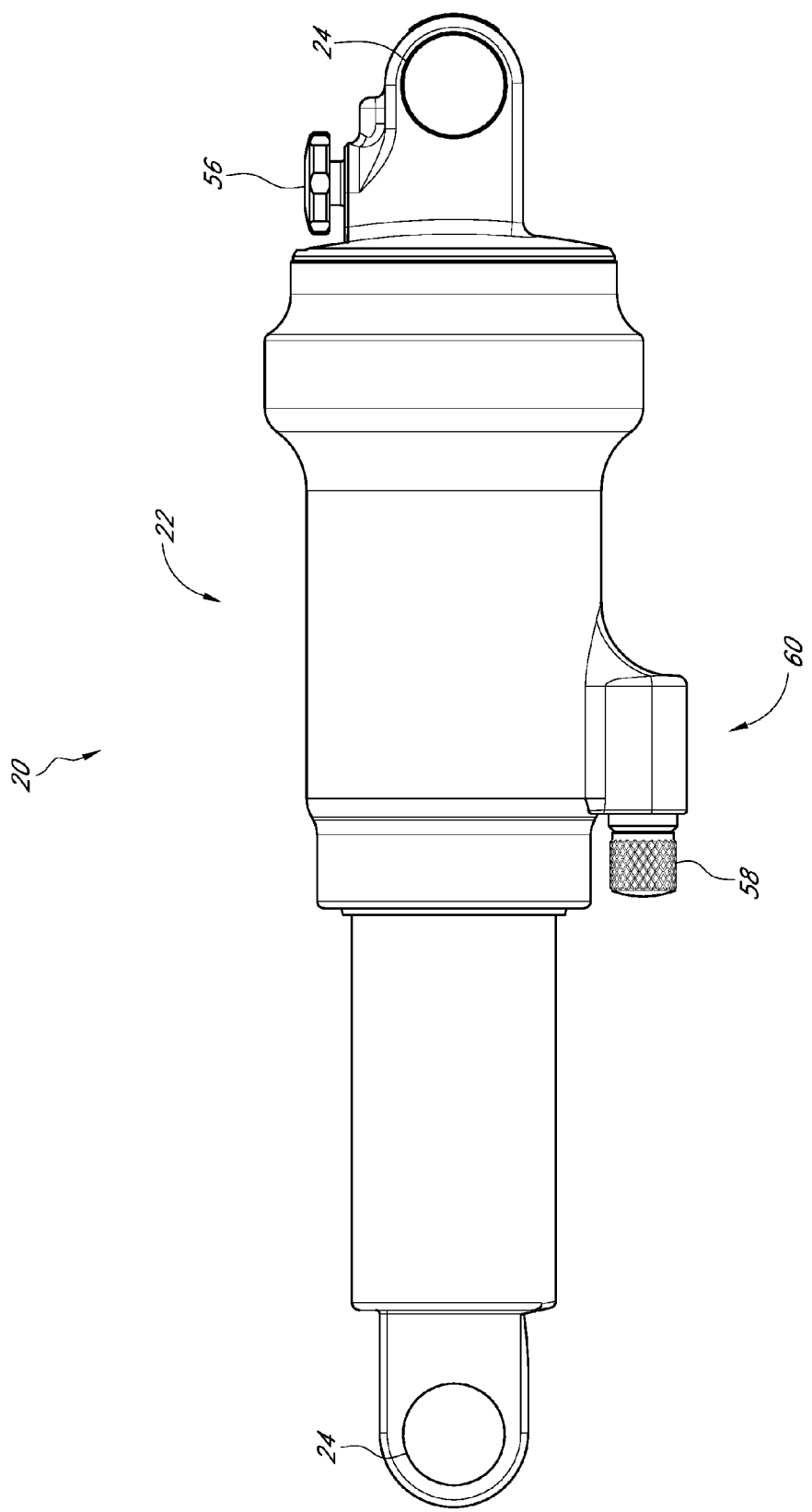
FIG. 2 is a perspective view of an embodiment of a shock absorber.

A shock absorber 20, shown in FIG. 2, can have a main shock body 22 and an eyelet 24 at either end. The shock absorber 20 can attach at the eyelets 24 to a bicycle frame 2 as part of a rear suspension, as shown in FIG. 1.

Figure 3:
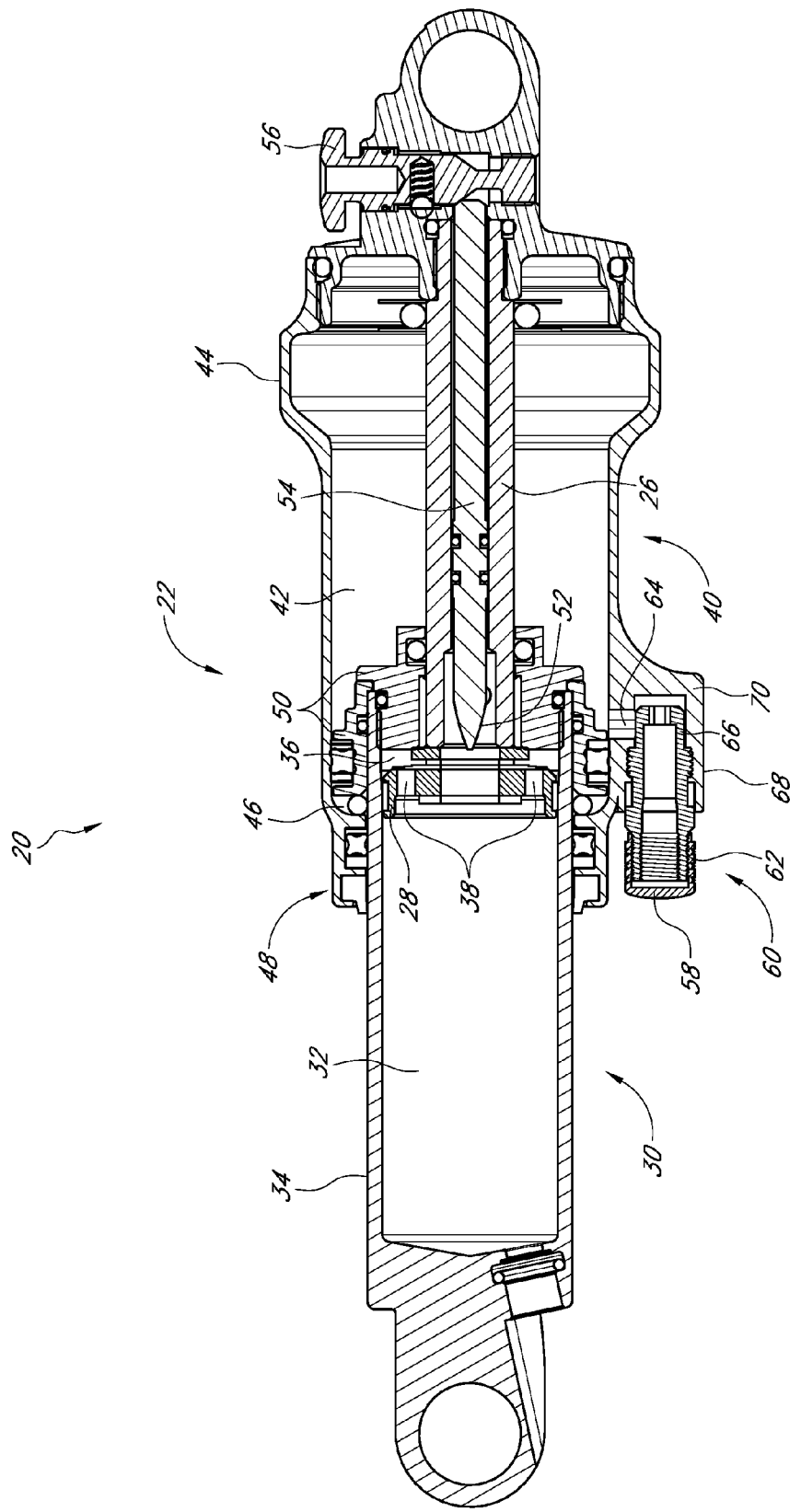
FIG. 3 shows a cross-section of the shock absorber of FIG. 2.

FIG. 3 is a cross-sectional view of the shock absorber 20 shown in FIG. 2. The shock absorber 20 includes a main shock body 22 and may include a reservoir 9 (FIG. 1). The shock absorber 20 includes a damping assembly 30 and a spring assembly 40. The spring assembly 40 is preferably located within the main shock body 22. The damping assembly 30 can be within the main shock body 22 or divided between the main shock body 22 and a reservoir 9.

The damping assembly 30 of the main shock body 40 shown in FIG. 3, desirably includes a tube 34 and a piston rod 26. The piston rod 26 carries a piston or compression piston 28 in sliding engagement with an interior surface of the tube 34. Thus, the piston rod 26 and piston 28 are movable relative to the tube 34.

The interior of the tube 34 desirably defines a piston chamber and the piston 28 further divides the interior of the tube 34 into a compression chamber 32 and a rebound chamber 36. The piston 28 desirably includes through-ports 38 which permit fluid to flow between the compression chamber 32 and the rebound chamber 36. However, as the piston 28 moves progressively further into the tube 34, the piston rod 26 takes up an increasing volume of the rebound chamber 36. That is, the reduction in volume of the compression chamber 32 is greater than the increase in the volume of the rebound chamber 36 (by an amount equal to the volume of the piston rod 26, or "rod volume", introduced into the tube 34). As a result, a reservoir 9 can be provided to accept the excess fluid that cannot be accommodated by the rebound chamber 36.

Thus, the reservoir is preferably an accumulator that accepts excess damping fluid upon compression of the shock absorber 20, and then returns the fluid to the main shock body 22 upon expansion or rebound of the shock absorber 20. Among other features, the reservoir 42 can include an inertia valve assembly and a position sensitive valve assembly, such as those described in particular in reference to FIGS. 2-4, 6-15 and the accompanying description in U.S. Pat. No. 7,552,935, hereby incorporated by reference herein and made a part of this specification.

The piston 28 can include one or more axial compression passages 38 that are covered on the end opening into the rebound chamber 36 by a shim or shim stack. The compression passages and shim or shim stack allows fluid to flow through these passages during compression but not during rebound. During rebound, the fluid flows from the rebound chamber 52 through an adjustable valve 52, located within the interior of the piston rod 26 near the piston 28, and into the compression chamber 32. The flow rate through the valve 52 is controlled by an adjustment rod 54 that is preferably connected to an external adjustment knob 56. In addition, other flow circuits between the compression and rebound chambers may also be provided.

Although the illustrated reservoir 9 in FIG. 1 is defined by a separate structure from the main shock body 22, in other arrangements the reservoir 9 and shock body 22 may share common structural components. Furthermore, in some arrangements, a separate reservoir may not be provided. Instead, the compression 32 and/or rebound 36 chambers may be configured to vary in volume to accommodate fluid displaced by the piston rod 26. Other suitable compensation mechanisms may also be used. In addition, in some embodiments, the shock absorber 20 does not include a damping assembly.

Figure 3A:
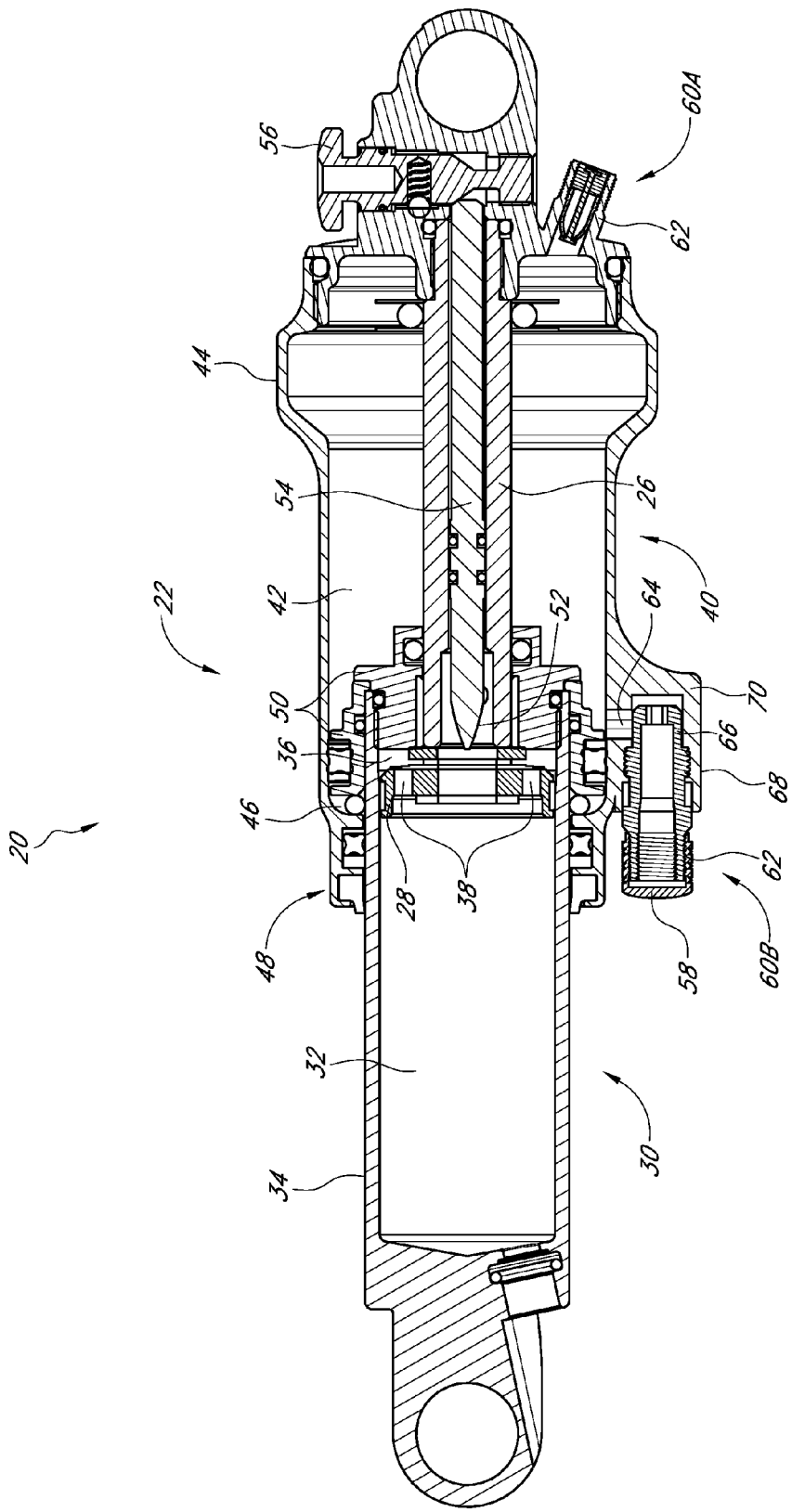
FIG. 3A shows another embodiment of a shock absorber in cross-section.

The spring assembly 40 of the shock absorber 20 illustrated in FIG. 3 preferably uses a compressed gas to bias the main shock body 22 toward an extended position. The compressed gas is stored in a gas chamber 42, which is defined by a tube, or gas cylinder 44. The gas chamber 42 can be partitioned from the fluid filled compression and rebound chambers 36 and 32 by an annular piston or spring piston 50. The piston 50 shown is in sealed, slidable engagement with both the piston shaft 26 and the inner wall of the gas cylinder 44. The illustrated piston 50 is shown as two pieces but may be one integrated piece. The pressure of the compressed gas may be adjustable by at least one valve 60 configured to permit communication with the gas chamber 42. FIG. 3A illustrates an embodiment with a first valve 60A and a second valve 60B. The two valves can both or individually be used for filling and/or adjusting the pressure within the gas chamber 42. For example, in some embodiments, the valve 60A, shown with a schematic representation of a Schrader valve, can be used to fill the gas chamber 42 and then the valve 60B can be used to adjust the sag position as will be described below.

During operation, the tube 34 is displaced along a longitudinal axis of the main shock body 22 into the interior of gas cylinder 44, which reduces the volume of the gas chamber 42. This reduction of volume increases the pressure of the gas chamber 42 and thus increases the biasing force tending to extend the main shock body 22. A compressed gas shock absorber is beneficial in that the biasing force of the compressed gas may replace that of a metallic coil spring, which results in a reduced weight of the shock absorber 20.

The illustrated shock absorber 20 also includes a negative gas chamber 46 defined between an end seal assembly 48 of the gas cylinder 44 and the piston 50. The negative gas chamber 46 exerts a force which resists expansion of the shock absorber 20. This force preferably assists in the initial compression stages of the shock absorber 20 and thus creates a smoother compression action.

As has been mentioned, a shock absorber can have various adjustment mechanisms to change or set certain characteristics of the shock absorber and how it responds under certain situations. One of these adjustments can include sag.

Sag refers to how much the suspension moves under the static load or body weight of the rider on the bicycle. The preload of a shock absorber can generally be adjusted so that the desired sag is achieved. Preload refers to the force applied to the spring before external loads, such as rider weight, are applied. More preload makes the suspension sag less, and less preload makes the suspension sag more. Adjusting preload affects the ride height of the suspension.

It can be desired to have a certain sag percentage when the rider sits on the bike. Common values for the sag percentage are about 20-35%, it can also be between about 5-45%, depending on the terrain, type of riding and amount of travel of the suspension, among other factors.

For currently available air shock absorbers, a specific setup procedure, which can include multiple steps and adjustments, is required to ensure maximum performance. Generally, the rider adjusts the air pressure and sag multiple times to achieve the desired sag when sitting on the bike. This includes measuring the shock absorber, filling the shock with air, sitting on the bike, measuring the sag, letting air out of the shock or adding more air, getting back on the bike, measuring the sag, these steps are repeated until the sag is adjusted to the desired position and can take multiple rounds of adjustment.

It is desirable to provide an improved sag adjustment. Particularly, to provide an adjustment that is easier for consumers and bike shops, while also providing an adjustment able to set the shock at the desired sag based on the specific weight and riding position of the individual rider.

Figure 4:
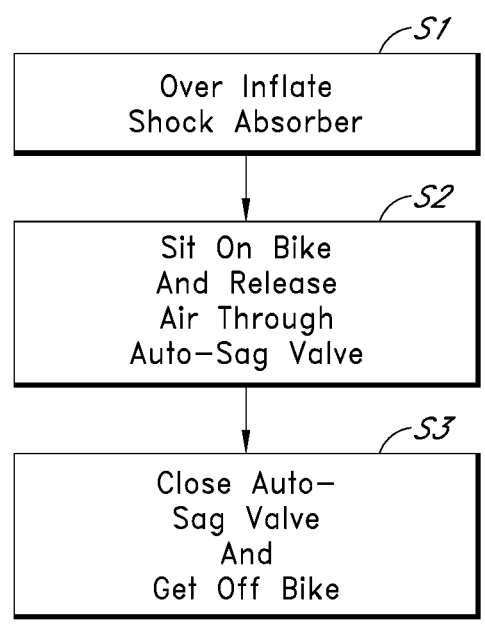
FIG. 4 is a flow chart illustrating a method of setting sag.

A shock absorber 20 can have a valve 60 that can be used to automatically adjust the sag valve. The valve 60, according to some embodiments, can allow a rider to adjust the air pressure once in order to achieve a proper sag percentage. FIG. 4 shows a method of setting sag and FIGS. 5-6 demonstrate the position of the shock absorber 20 at different parts of the method. FIGS. 5A-B and 6A show the fluid flow represented by the arrows.

Figure 5:
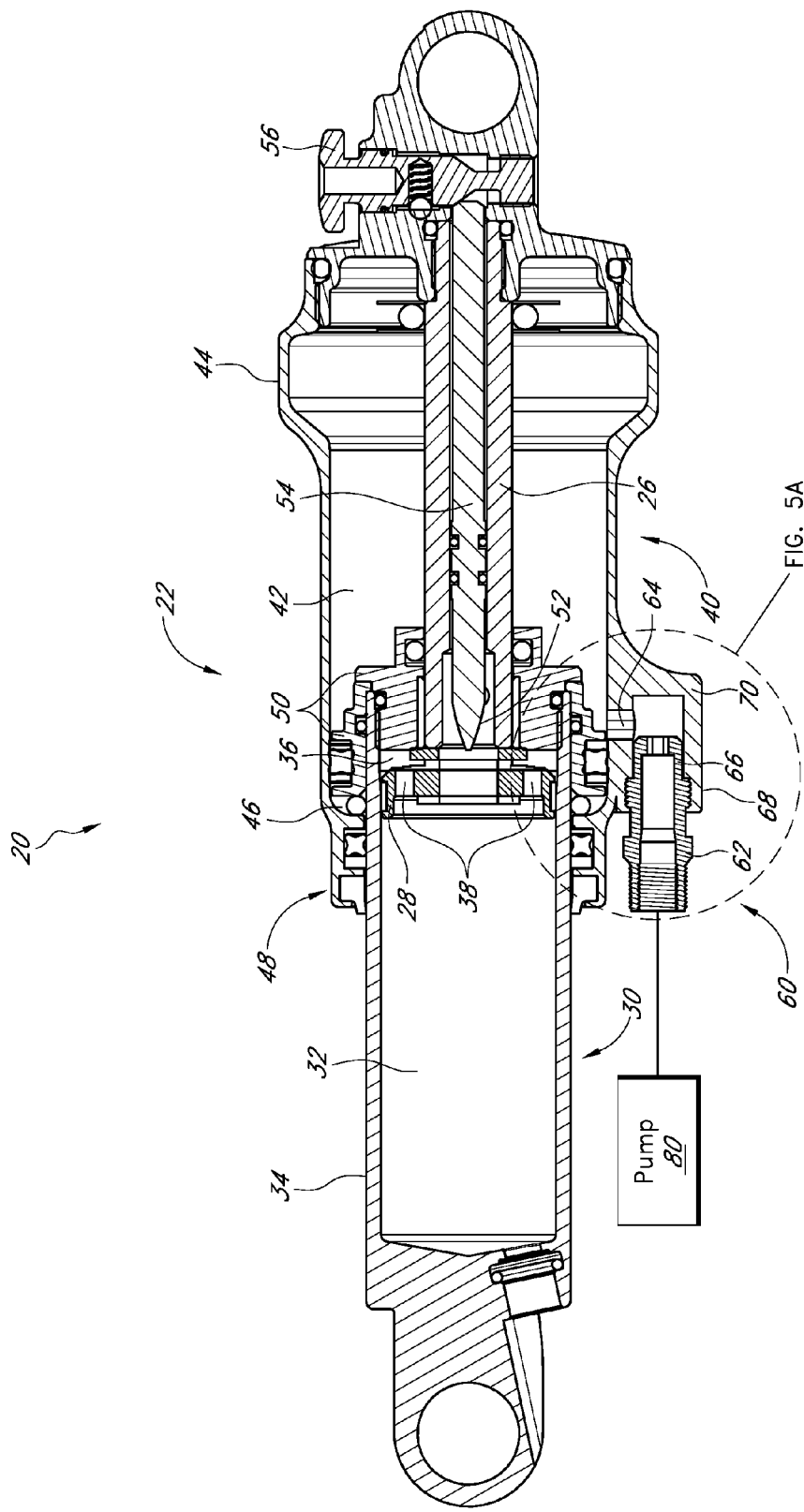
FIGS. 5 and 6 show a shock absorber during a method of setting sag.
Figure 5A:
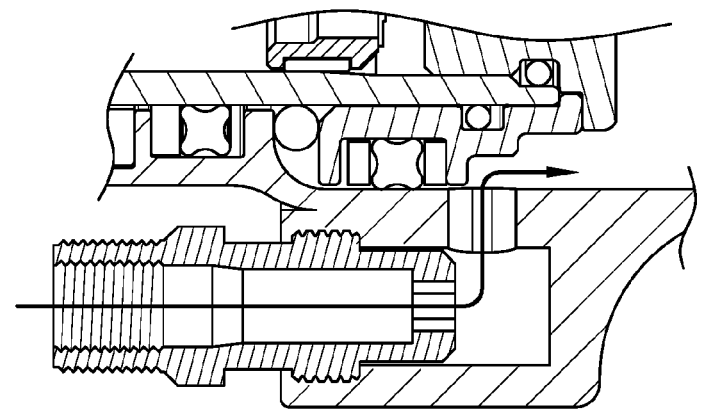
FIGS. 5A-B and 6A are detail views showing fluid flow.
Figure 5B:
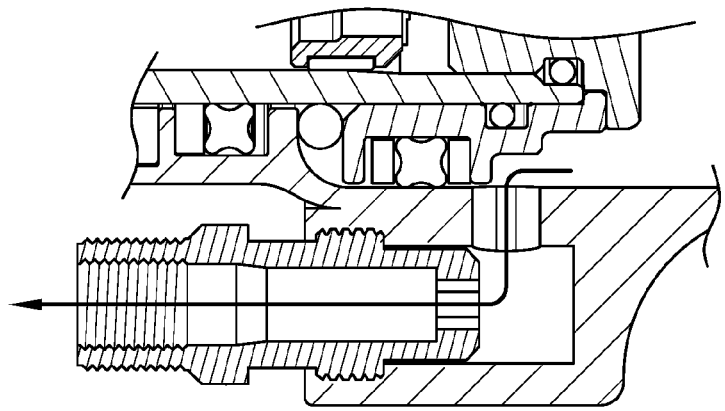
Figure 6A:
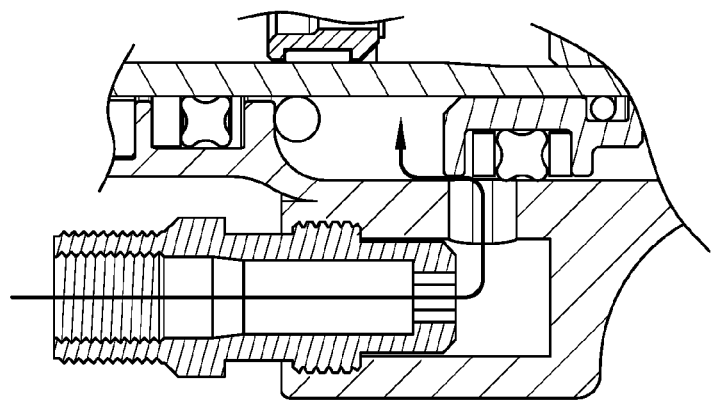

In a first step, S1, a shock absorber air pump 80 can be connected to the valve 60 (FIG. 5). The valve 60 can have a Schrader or Presta style valve for connecting to the pump.

In some embodiments, the valve 60 can have threads 62 for receiving a cap 58 and also for threadedly receiving the pump. Using the pump, the air pressure within the shock absorber 20 can then be set to a value well exceeding that required for a typical rider, or the typical final pressure (FIG. 5A). This can be the same for all riders, e.g. the owner's manual can instruct all users to inflate the shock absorber 20 to a pressure of at least, 200, 250, 300, or 350 psi, for example. In some embodiments, the shock pressure can be at least 20%, 30% or 40% over the approximate typical final pressure. The gas chamber 42 is now charged and is a positive chamber, that is, it has a positive pressure within the gas chamber 42. The typical final pressure can be between about 150-220 psi, or between about 100-240 psi.

Figure 6:
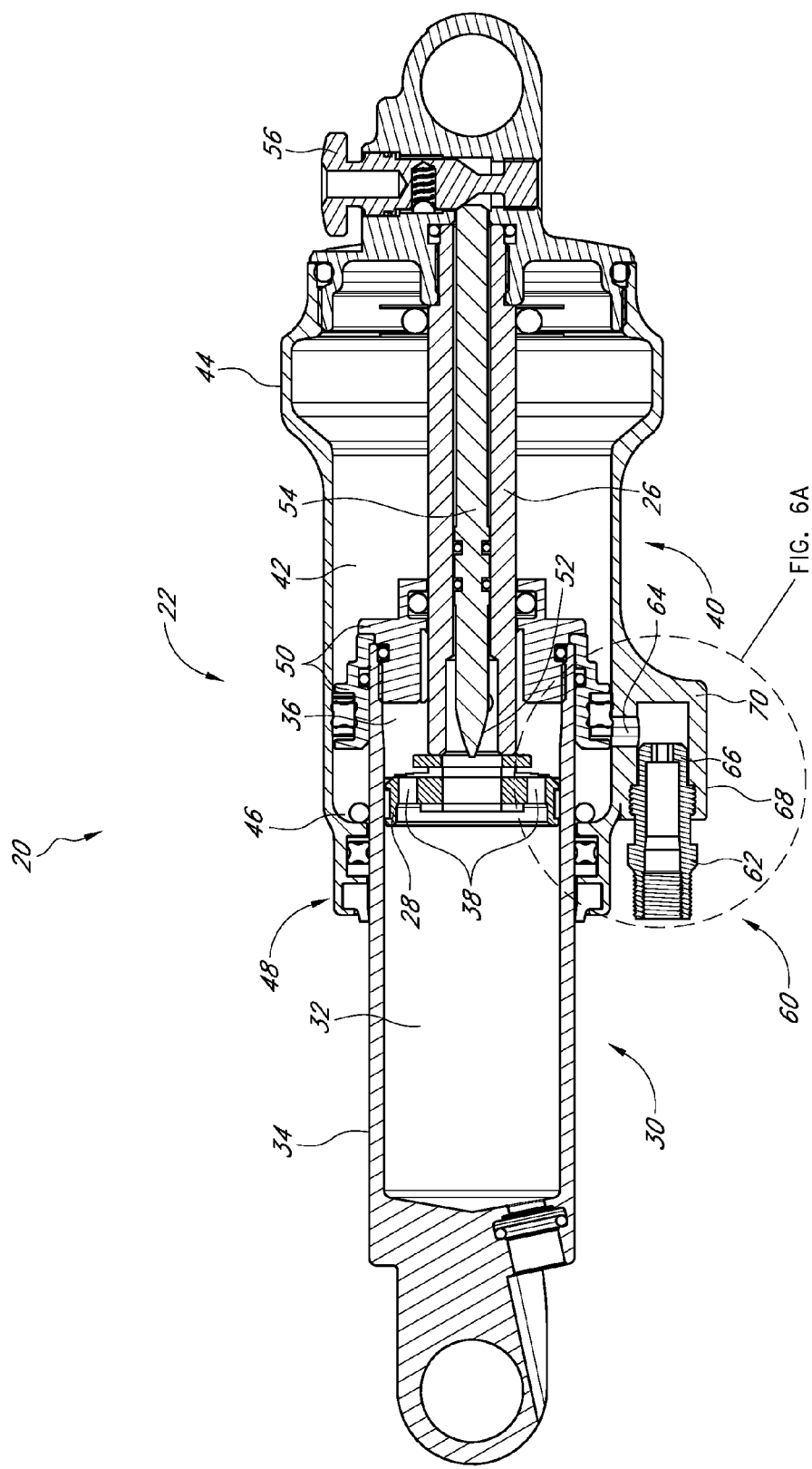

In a next step, S2, a rider can sit on the bicycle in the riding position with his or her feet on the pedals. Air can now be released from the gas chamber 42 in the shock absorber 20 through the valve 60 (FIG. 5B). As air is released, the pressure in the gas chamber 42 will drop and the shock will compress due to the weight of the rider and the pressure drop. As the pressure drops, the piston 50 will slide within the gas chamber 42 decreasing the volume of gas chamber while increasing the volume of the negative gas chamber 46. Once the piston 50 slides past the port 64 the air pressure in the gas chamber 42 will no longer drop as the port 64 is no longer in fluid communication with the gas chamber 42 (FIG. 6). As mentioned previously, in some embodiments a pump can be attached to a first valve 60A to fill the shock absorber and a second valve 60B can be used to release the air (FIG. 3A), other configurations are also possible.

Once the piston 50 is past the port 64, the negative pressure in the negative gas chamber 46 will equalize to atmospheric pressure (FIG. 6A). The internal pressure of the shock absorber 20 is now setup specifically for the individual rider's weight and riding position. As the rider's weight and riding position can help determine when the piston 50 will pass by the port 64 to prevent further pressure drop in positive gas chamber 42. Accordingly, in some embodiments, the sag setup is now complete as the shock is now in the sag position for the individual rider.

The valve 60 can now be closed, S3, and the rider can get off the bike. The gas chamber 42 pressure can now be advantageously set to achieve a desired sag % for the specific rider. Under certain conditions, the sag % can be an ideal sag % for the specific rider.

According to some embodiments, a method of setting sag can include increasing air pressure within a shock absorber to at least 250 psi, sitting on the bike in a riding position and releasing the valve 60 until air flow stops. Sag position can now be set without any additional work by the rider. As can be seen, such a procedure can greatly simplify adjustment of sag over the currently available shock absorber designs.

In some embodiments, the valve 60 can include an internal valve 66 and threads 68. The internal valve 66 can be configured to close the port 64 when the internal valve 66 is in a first position. The internal valve 66 can be backed out of the valve housing 70 to open the port 64. This can help to ensure that the valve 60 remains securely shut when in the first or closed position (FIG. 3) and can help to ensure that the gas chamber 42 remains pressurized at the set pressure. Other configurations and types of valves are also possible. As mentioned previously, a Schrader valve or other type of valve can be used for the bleed down or air release operation. A Schrader valve can allow for both filling the valve and bleeding down, though the shock absorber can alternatively have a fill only valve, such as a valve near the eyelet (similar to FIG. 3A) and a bleed only type valve that can be used to adjust the final sag position.

In some embodiments, a shock absorber air pump can be used to both increase the pressure of the gas chamber 42 and release pressure, such as releasing pressure until the piston 50 passes over the port 64.

A valve 60 can beneficially simplify sag setup for both end users and bike shops. A valve 60 can reduce setup time to achieve a desired sag position. A valve 60 can reduce user error and increase repeatability.

Figure 7:
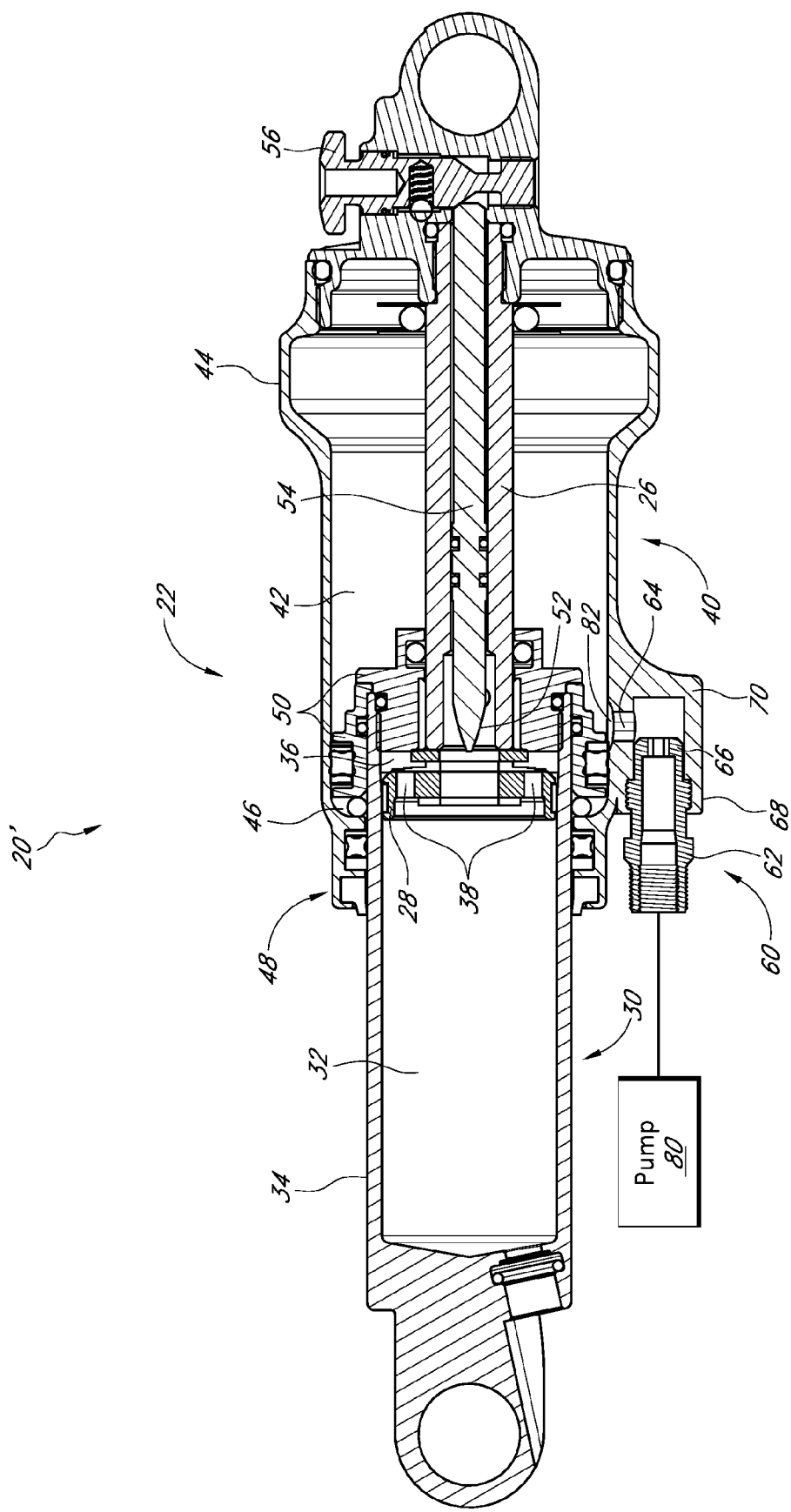
FIGS. 7 and 8 show another embodiment of a shock absorber during a method of setting sag.
Figure 8:
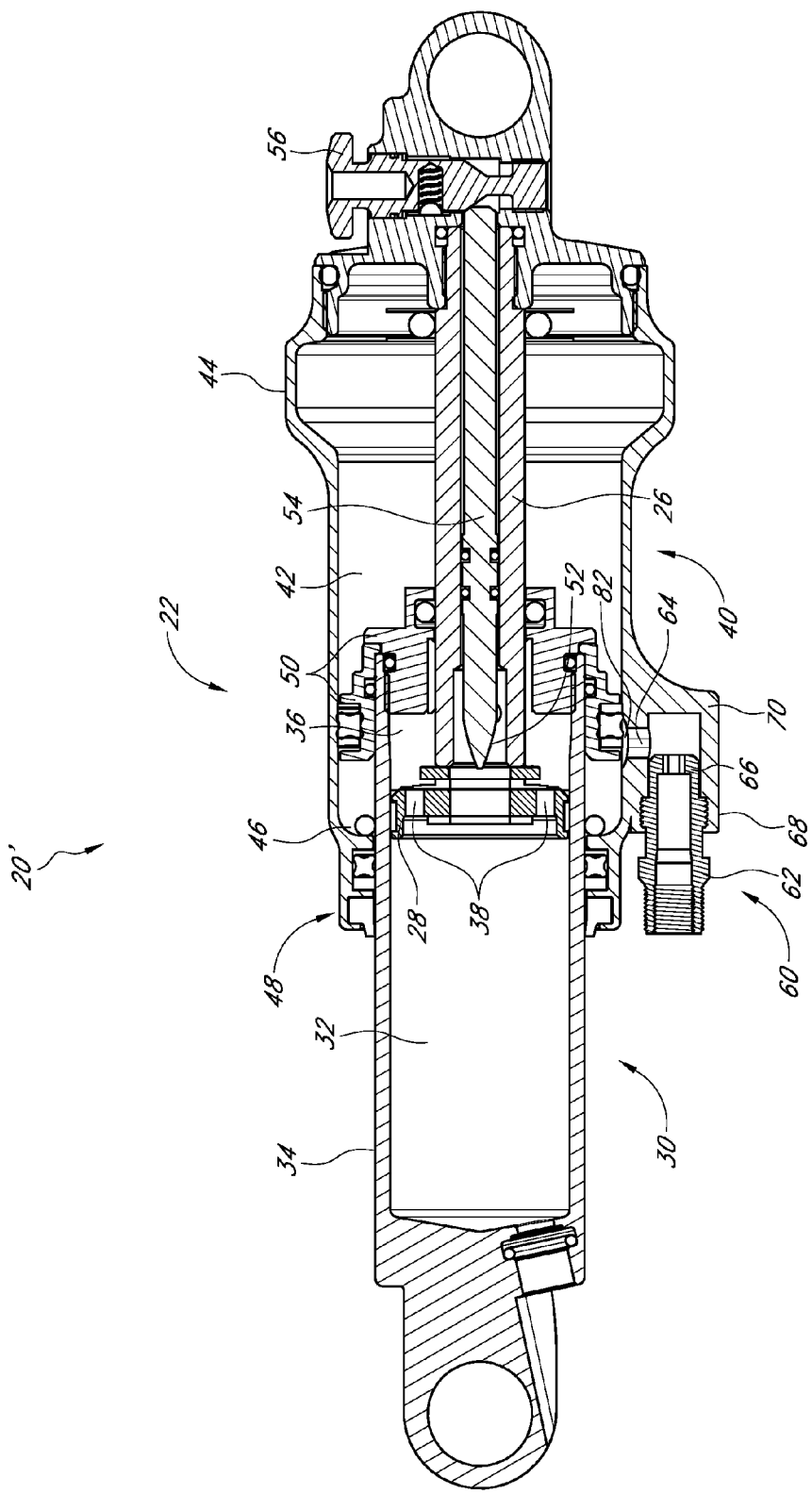
Figure 9:
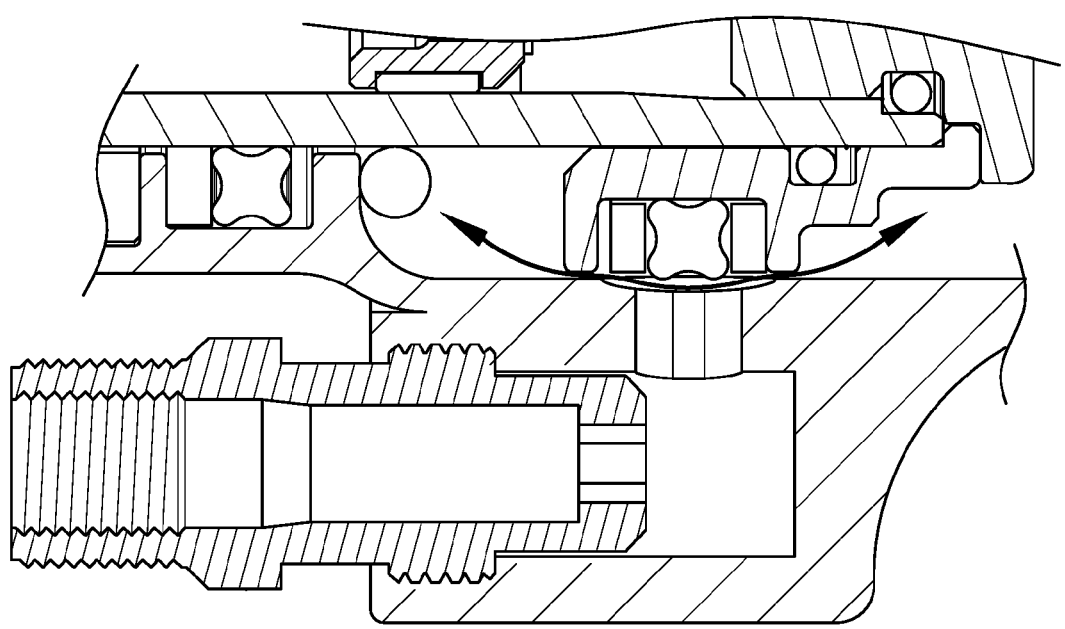
FIG. 9 is a detail view showing fluid flow.

Turning now to FIGS. 7-9 another embodiment of shock absorber 20' is shown. As can be seen, shock absorber 20' includes a bypass channel 82. The bypass channel 82 can be a groove along an inner surface of the gas cylinder 44. For example, the groove can be a circumferential groove or a partially circumferential groove. The bypass channel 82 can be similar to the bypass channel described in particular in reference to FIGS. 3-5 and the accompanying description at columns 5 and 6 in U.S. Pat. No. 6,135,434, hereby incorporated by reference herein and made a part of this specification. The bypass channel 82 can permit fluid to bypass the piston 50 to equalize the pressure in the gas cylinder 44 between the gas chamber 42 and the negative gas chamber 46.

According to certain embodiments, the sag position can be set in a manner similar to that described previously. The gas chamber 42 can be charged with gas, for example by a pump 80 (FIG. 7). The gas chamber 42 can be over charged or over inflated to a pressure exceeding the final pressure for a typical rider. A user can then mount the bicycle and while assuming a riding position, gas can be released from the shock absorber through the valve 60.

As shown, gas can leave the gas chamber 42 until the piston 50 passes the valve port 64 (FIG. 8). The negative gas chamber 46 can now equalize with atmospheric pressure. After the valve is closed and the user dismounts the bicycle, the shock absorber 20' will move back towards the top out position of FIG. 7. In other words, as the load is removed from the shock absorber 20', the shock will decompress and the piston 50 will move back towards the initial position. As it does so, the piston 50 will pass over the bypass 82. The bypass 82 will then permit fluid to bypass the piston 50 to equalize the pressure in the gas cylinder 44 between the gas chamber 42 and the negative gas chamber 46 (FIG. 9). Thus, the negative gas chamber 46 can become charged with air pressure. Upon further movement of the piston as shown, the gas chamber 42 and the negative gas chamber 46 again are sealed relative to one another.

The shock absorber 20' can beneficially be used to automatically set the sag position based on an individual's weight and rider position. The shock absorber 20' and bypass 82 can advantageously be used to charge the negative gas chamber 46. Having both the gas chamber 42 and the negative gas chamber 46 charged can create an effective air spring on both sides of the piston from the sag position. This can also result in better, more fluid movement of the shock absorber.

Although the preferred embodiment of the shock absorber illustrated in FIGS. 1 and 2 are used with the rear wheel of a bicycle, in other preferred embodiments, it may also be incorporated into the front wheel of the bicycle. Thus, the shock absorber may be a rear shock or a front shock such as a front suspension fork.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A method of setting sag on a bicycle comprising: over inflating a gas chamber of a shock absorber on a bicycle to an over inflated pressure exceeding a final pressure required to set the shock at a desired sag for a static load, the shock absorber comprising a gas cylinder divided between the gas chamber and a negative gas chamber by a piston; deflating the shock absorber through a port in the shock absorber until the deflation stops, while a user assumes a riding position on the bicycle; closing the port; passing the piston over the port after the user has dismounted the bicycle; and equalizing the pressure in the gas cylinder by permitting fluid to go around the piston in the gas cylinder at the port and flow between the gas chamber and the negative gas chamber.

2. The method of claim 1, further comprising equalizing a pressure within the negative gas chamber with atmospheric pressure before closing the port.

3. The method of claim 1, wherein deflating the shock absorber through the port in the shock absorber until the deflation stops comprises passing the piston by the port.

4. The method of claim 1, further comprising sealing the gas chamber from the negative gas chamber after equalizing the pressure.

5. The method of claim 1, wherein equalizing the pressure in the gas cylinder comprises permitting fluid to go around the piston in the gas cylinder at a bypass and flow between the gas chamber and the negative gas chamber.

6. The method of claim 1, wherein equalizing the pressure in the gas cylinder comprises passing the piston over a groove in the gas cylinder.

7. The method of claim 1, wherein over inflating the gas chamber comprises inflating the gas chamber to a pressure between 200 psi and 330 psi.

8. The method of claim 1, wherein over inflating the gas chamber comprises inflating the gas chamber to a pressure at least 20% over the final pressure required to set the shock at the desired sag for a static load.

9. The method of claim 1, further comprising attaching an air pump to a valve in fluid communication with the port.

10. The method of claim 9, wherein the air pump is used to both inflate and deflate the pressure of the gas chamber.

* * * * *

UNITED STATES PATENT AND TRADEMARK OFFICE
CERTIFICATE OF CORRECTION

PATENT NO. : 9,759,283 B2
APPLICATION NO. : 15/143209
DATED : September 12, 2017
INVENTOR(S) : Jan Talavasek It is certified that error appears in the above-identified patent and that said Letters Patent is hereby corrected as shown below:

In the Claims

In Column 10 at Line 52, In Claim 7, change "330" to --350--.

Signed and Sealed this
Twenty-seventh Day of March, 2018

Andrei Iancu
*Director of the United States Patent and Trademark Office*